(12) United States Patent
Mock et al.

(10) Patent No.: US 11,376,946 B2
(45) Date of Patent: Jul. 5, 2022

(54) MAGNETIC COUPLERS FOR SHAFT ASSEMBLY

(71) Applicant: DEERE & COMPANY, Moline, IL (US)

(72) Inventors: Joey A. Mock, East Moline, IL (US); Drew D. Brennan, Holland, MI (US)

(73) Assignee: DEERE & COMPANY, Moline, IL (US)

( * ) Notice: Subject to any disclaimer, the term of this patent is extended or adjusted under 35 U.S.C. 154(b) by 79 days.

(21) Appl. No.: 16/799,329

(22) Filed: Feb. 24, 2020

(65) Prior Publication Data
US 2021/0260988 A1 Aug. 26, 2021

(51) Int. Cl.
| | | |
|---|---|---|
| *B60K 11/00* | (2006.01) | |
| *B60K 11/08* | (2006.01) | |
| *H02K 49/10* | (2006.01) | |
| *A01D 69/06* | (2006.01) | |

(52) U.S. Cl.
CPC ............ *B60K 11/08* (2013.01); *H02K 49/108* (2013.01); *A01D 69/06* (2013.01)

(58) Field of Classification Search
CPC .............. B60K 11/108; B01D 46/0056; A01D 41/1252; H02K 49/046; H02K 49/108
See application file for complete search history.

(56) References Cited

U.S. PATENT DOCUMENTS

| | | | | |
|---|---|---|---|---|
| 4,542,785 A | * | 9/1985 | Bagnall | F01P 11/12 165/95 |
| 5,477,094 A | * | 12/1995 | Lamb | H02K 49/046 310/75 D |
| 5,595,537 A | * | 1/1997 | Jungemann | F01P 11/12 460/100 |
| 6,193,772 B1 | * | 2/2001 | Wiefel | F01P 11/12 55/283 |
| 6,248,145 B1 | * | 6/2001 | Radke | B01D 46/0056 55/295 |
| 6,514,303 B2 | * | 2/2003 | Lukac | A01B 51/026 123/198 E |
| 6,974,487 B2 | * | 12/2005 | Twiefel | A01D 41/1252 55/289 |
| 7,946,367 B2 | * | 5/2011 | Good | B01D 46/0056 180/68.1 |
| 7,981,175 B2 | * | 7/2011 | D'hondt | A01D 41/1252 55/290 |
| 8,454,718 B2 | * | 6/2013 | Buchmann | F01P 11/12 55/385.3 |

(Continued)

FOREIGN PATENT DOCUMENTS

JP 2008275033 A 11/2008

*Primary Examiner* — Hau V Phan
(74) *Attorney, Agent, or Firm* — Michael Best & Friedrich LLP

(57) ABSTRACT

A rotary screen door assembly for a work vehicle includes a door configured to couple to an enclosure of the work vehicle for movement between a closed position and an open position, and a screen rotatably supported on the door and configured to filter air passing through an air inlet defined in the door. The rotary screen door assembly also includes a first shaft segment rotatably supported on the door and coupled to the screen, the first shaft segment having a first magnetic coupler configured to engage a corresponding second magnetic coupler of the work vehicle.

10 Claims, 6 Drawing Sheets

(56) References Cited

U.S. PATENT DOCUMENTS

| | | | |
|---|---|---|---|
| 8,974,564 B2* | 3/2015 | Hershbarger | B01D 46/10 55/296 |
| 2004/0003578 A1* | 1/2004 | Twiefel | A01D 41/1252 55/289 |
| 2007/0022720 A1* | 2/2007 | Guertin | B01D 46/0083 55/289 |
| 2016/0256811 A1* | 9/2016 | Demonie | F01P 11/06 |

* cited by examiner

MAGNETIC COUPLERS FOR SHAFT ASSEMBLY

BACKGROUND

The present disclosure relates to work vehicles having a rotary screen driven by a shaft assembly, and magnetic couplers for coupling shaft segments of the shaft assembly.

SUMMARY

In one embodiment, the disclosure provides a work vehicle including a ground-engaging implement and a chassis coupled to the ground-engaging implement and supporting a body that defines an enclosure. The work vehicle also includes a prime mover configured to move the chassis along a ground surface on the ground-engaging implement. The work vehicle further includes a door pivotably coupled to the body and movable between a closed position covering the opening, and an open position permitting access to the enclosure through the opening. The work vehicle also includes a screen rotatably supported on the door and configured to filter air passing through an air inlet defined in the door, and a screen drive assembly configured to deliver torque to the screen to rotate the screen. The screen drive assembly includes a first shaft segment rotatably supported on the door and coupled to the screen, the first shaft segment having a first magnetic coupler. The screen drive assembly also includes a second shaft segment rotatably supported on the body and operably coupled to the prime mover, the second shaft segment having a second magnetic coupler. When the door is in the closed position, the first magnetic coupler engages the second magnetic coupler to couple the first shaft segment to the second shaft segment. When the door is moved to the open position, the first magnetic coupler disengages the second magnetic coupler to decouple the first shaft segment from the second shaft segment.

In another embodiment the disclosure provides a rotary screen door assembly for a work vehicle. The rotary screen door assembly includes a door configured to couple to an enclosure of the work vehicle for movement between a closed position and an open position, and a screen rotatably supported on the door and configured to filter air passing through an air inlet defined in the door. The rotary screen door assembly also includes a first shaft segment rotatably supported on the door and coupled to the screen, the first shaft segment having a first magnetic coupler configured to magnetically engage a corresponding second magnetic coupler of the work vehicle.

In another embodiment, the disclosure provides a rotary screen drive assembly for a work vehicle, the work vehicle including a prime mover, a body defining an enclosure, a door coupled to the body and movable between a closed position covering an opening to the enclosure, and an open position permitting access to the enclosure through the opening, and a screen rotatably supported on the door and configured to filter air passing through an air inlet defined in the door. The rotary screen drive assembly includes a first shaft segment having a first end configured to be coupled to the screen to drive the screen to rotate relative to the door, and having a second end supporting a first magnetic coupler. The rotary screen drive assembly also includes a second shaft segment having a first end configured to be coupled to the prime mover, and having a second end supporting a second magnetic coupler configured to selectively engage the first magnetic coupler to rotatably couple the first shaft segment to the second shaft segment when the door is in the closed position.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways.

Figure 1:
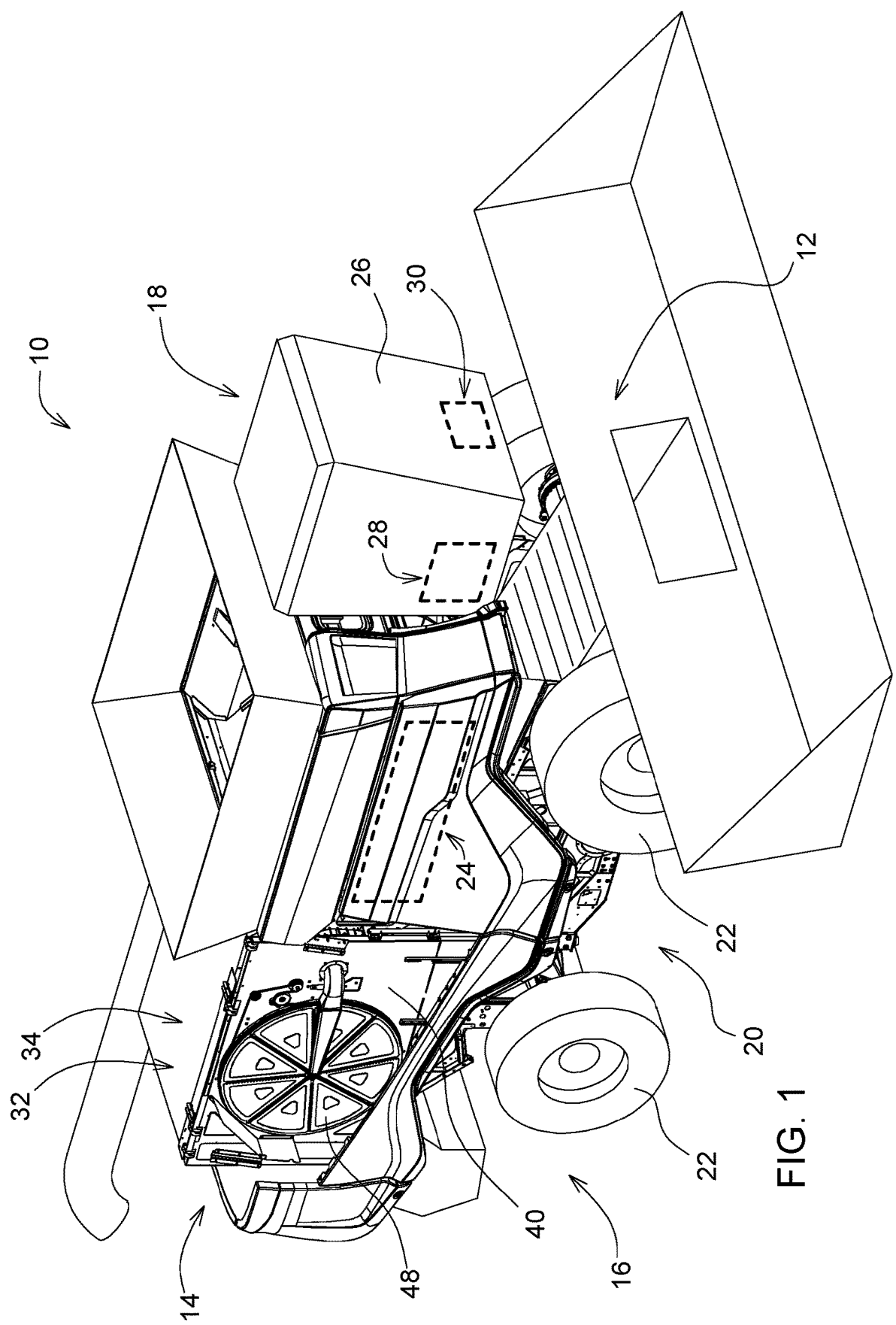
FIG. 1 is a perspective view of a work vehicle according to some embodiments.

FIG. 1 illustrates a work vehicle 10 including a front portion 12, a rear portion 14, a first side portion 16, a second side portion 18, a chassis 20, wheels 22, a prime mover 24 (e.g., an internal combustion engine, an electric motor, etc.), a cab 26 connected to the chassis 22 proximate the front portion 12, a controller 28, and a user interface 30. While wheels 22 are illustrated, other ground-engaging implements, such as tracks, can be utilized. The prime mover 24 is coupled to the chassis 20 proximate the front portion 12 and configured to provide power to the wheels 22 to thereby move the work vehicle 10 over a ground surface.

The controller 28 can be positioned in or near the cab 26 and is electrical communication with the wheels 22 and the prime mover 24 to send and receive signals from the wheels 22 and the prime mover 24. The user interface 30 is located in the cab 26 such that an operator positioned in the cab 26 can engage the user interface 30, which is in electrical communication with the controller 28 to send and receive signals.

The chassis 22 supports a body 32 that defines an enclosure 34 containing therein one or more cooling cores 36 (FIG. 3) (e.g., a radiator, an oil cooler, an air conditioner condenser, etc.) supported by the body 32 and thermally communicating with the prime mover 24 and/or the cab 26. One or more fans 38 are supported within the enclosure 34 to draw cooling air into the enclosure 34 and across the cooling cores 36.

Figure 2:
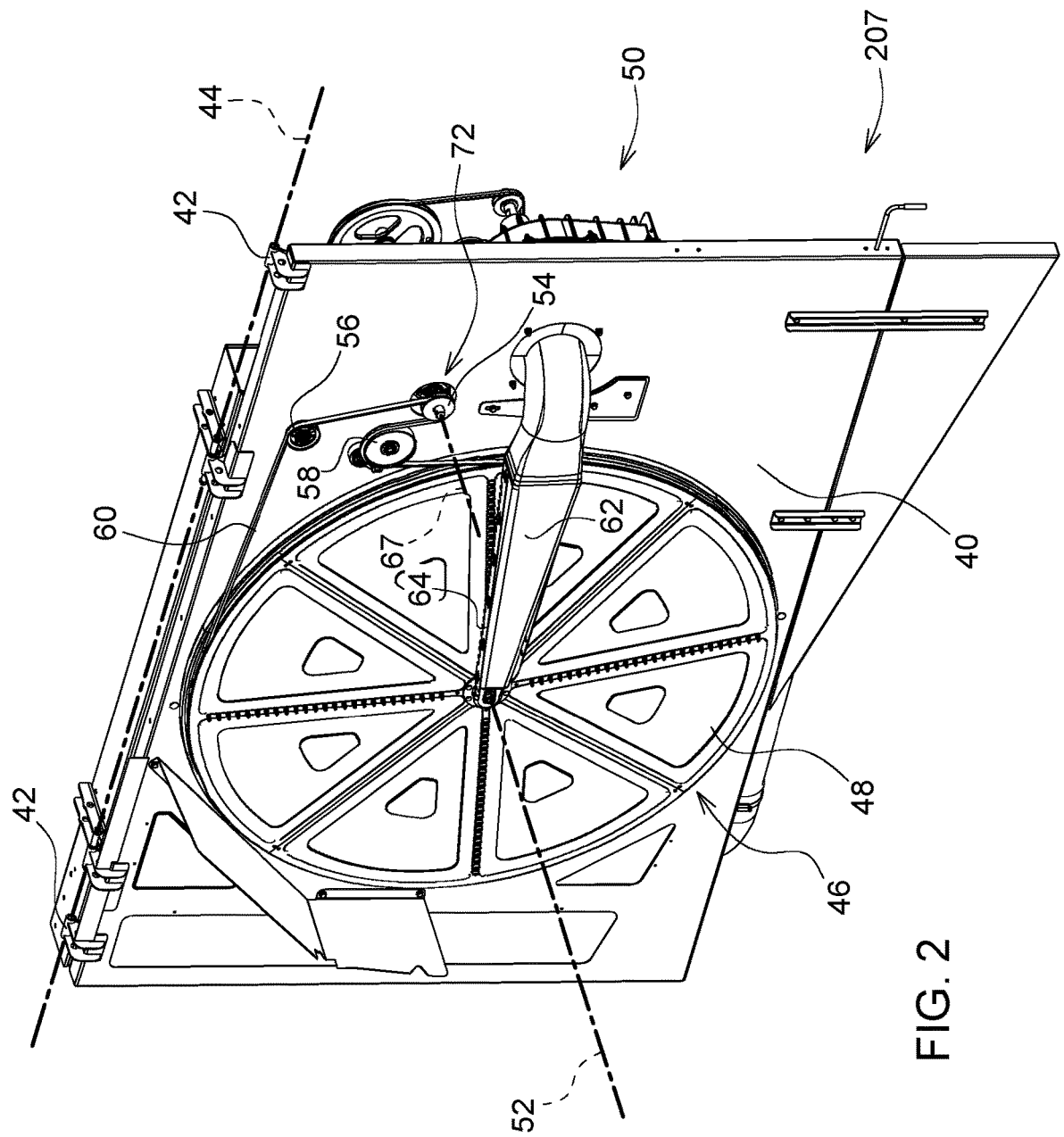
FIG. 2 is first side perspective view of a portion of the work vehicle of FIG. 1.

With reference to FIGS. 1 and 2, a rotary screen door 40 is coupled to the body 32 via hinges 42 and selectively provides access to the enclosure 34. The screen door 40 is pivotable about a hinge axis 44 to selectively open the enclosure 34 to expose the cooling cores 36 contained therein (e.g., to facilitate cleaning and/or servicing of the cooling cores 36), and to selectively close the enclosure 34 (e.g., to prevent dust, plant matter, other debris, and other contaminants from entering).

The screen door 40 defines an inlet opening 46 that allows a cooling airflow to pass therethrough and into the enclosure 34 to exchange heat with the cooling cores 36. The screen door 40 also rotatably supports a rotary drum-type air filter or rotary screen 48 that is mounted over the inlet opening 46. The rotary screen 48 is perforated with closely spaced holes sufficiently large to pass a large volume of air therethrough, while filtering out debris that might otherwise become lodged within and interfere with the flow of cooling air through the cooling cores 36.

With reference to FIG. 2, the work vehicle 10 includes a screen drive assembly 50 that transfers torque supplied from the prime mover 24 to the rotary screen 48 to drive the rotary screen 48 to rotate relative to the screen door 40 about a rotary screen axis 52. The screen drive assembly 50 includes a driven pulley 54, an idler pulley 56, and a tensioner pulley 58 supported on the screen door 40, and a screen belt 60 trained around the rotary screen 48, the idler and tensioner pulleys 56, 58, and the driven pulley 54 to transfer torque from the driven pulley 54 to the rotary screen 48. An L-shaped vacuum arm 62 extends over the rotary screen 48 and communicates with successive areas of the rotary screen 48 as the rotary screen 48 rotates to vacuum away debris caught in the rotary screen 48. The vacuum arm 62 includes brushes 64 extending to engage the rotary screen 48 to sweep away debris.

Figure 3:
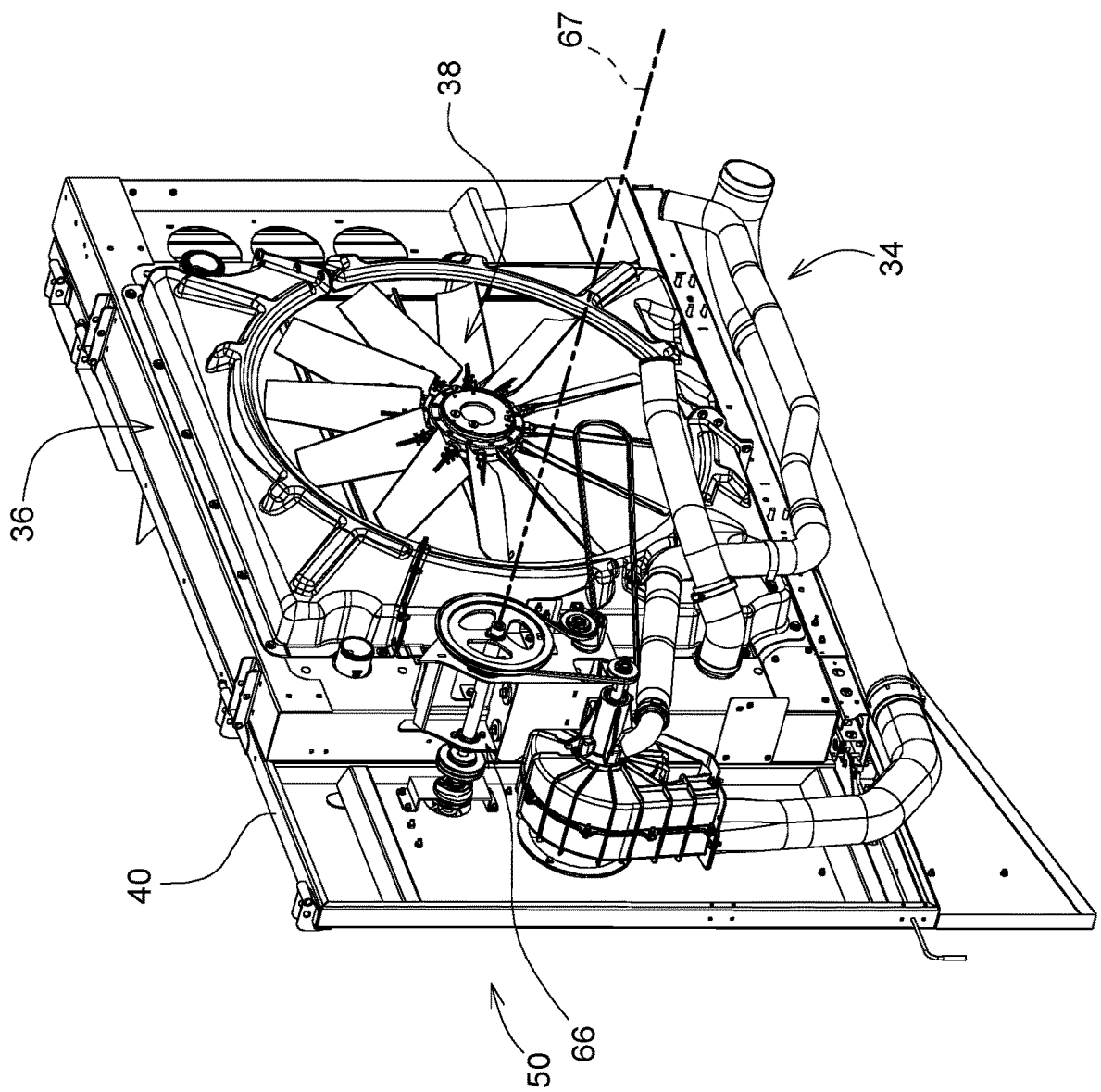
FIG. 3 is a second side perspective view of the portion of the work vehicle shown in FIG. 2.
Figure 4:
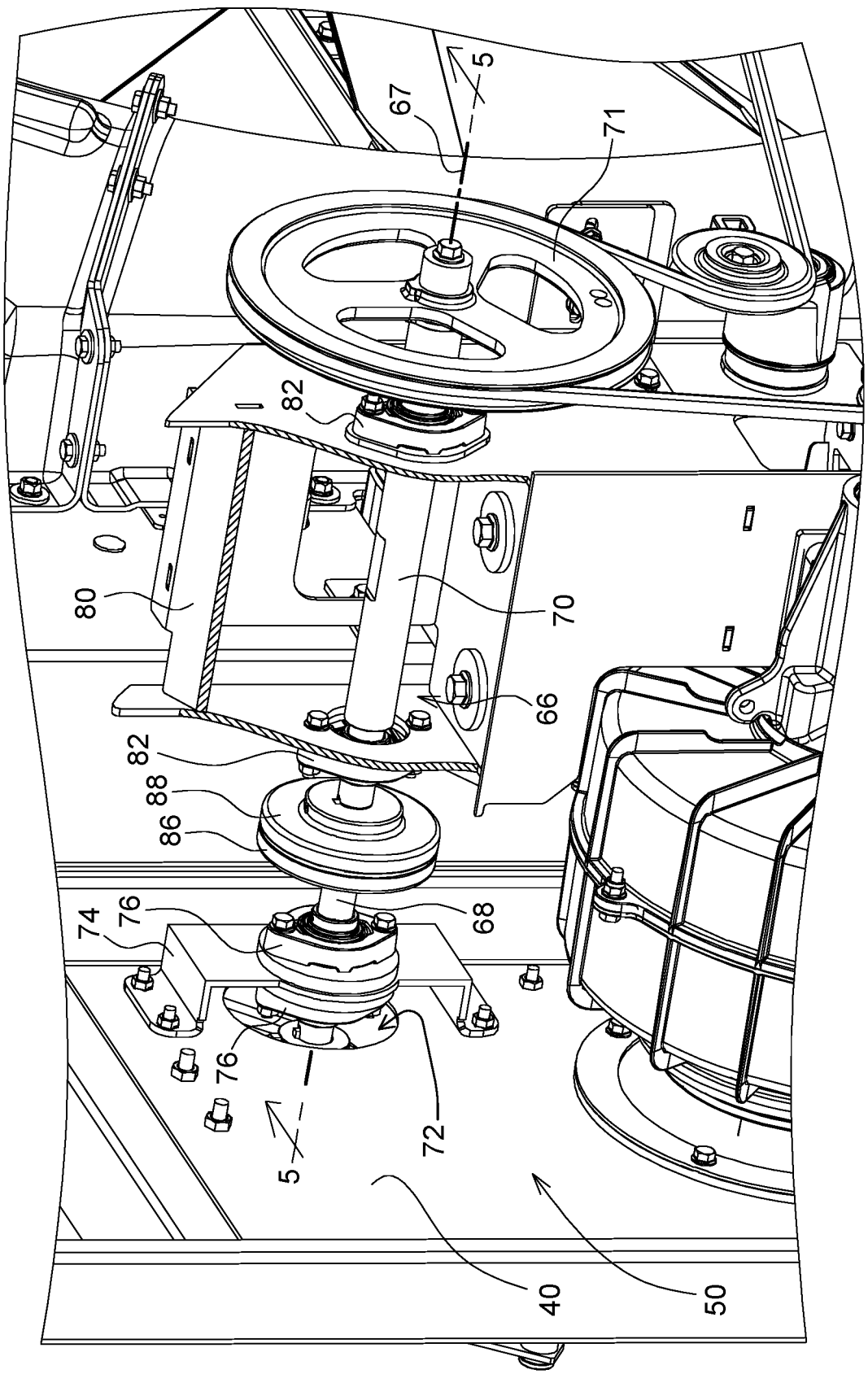
FIG. 4 is a close up perspective view of the portion of the work vehicle shown in FIG. 3.
Figure 5:
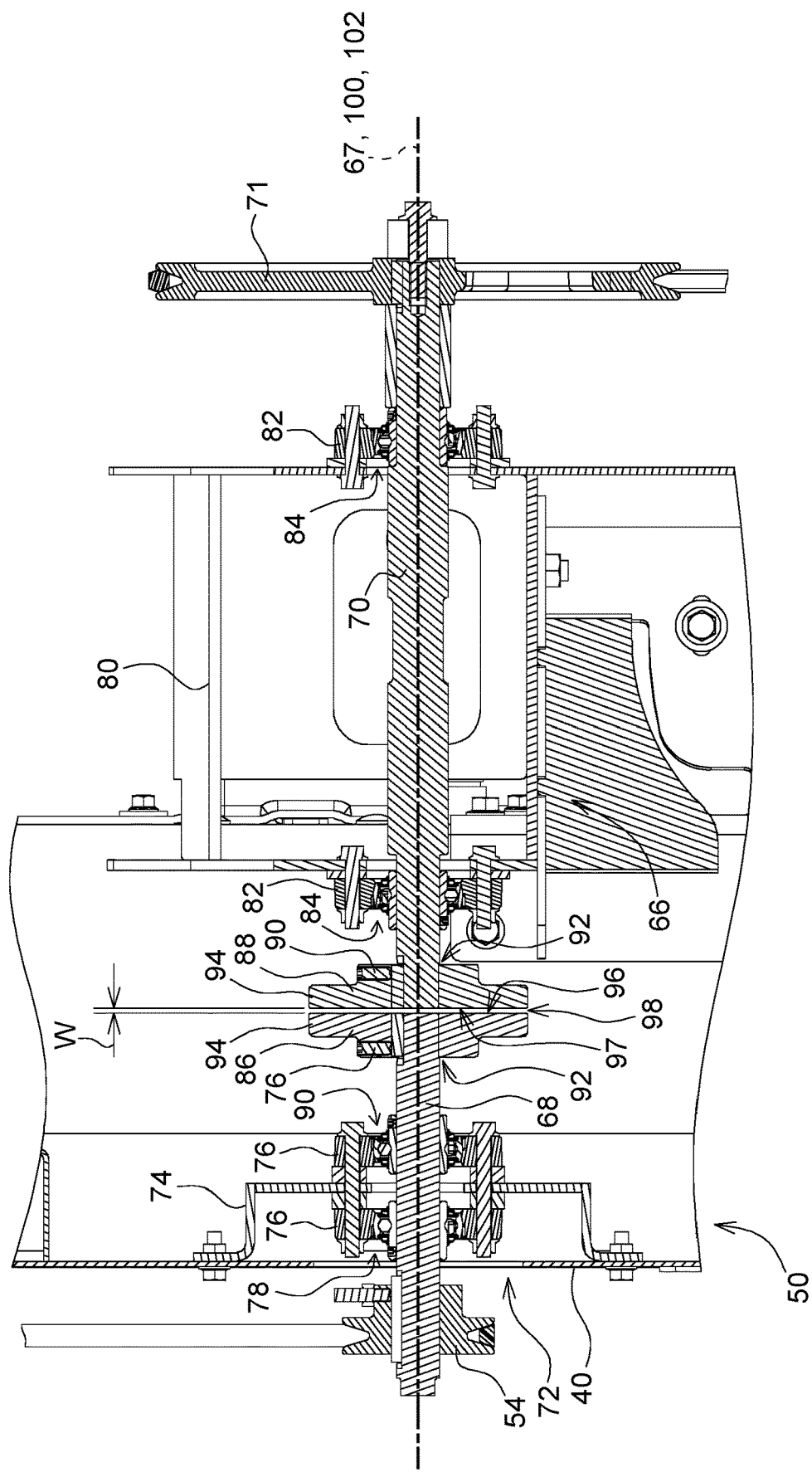
FIG. 5 is a cross-sectional view of the portion of the work vehicle shown in FIG. 2, taken along line 5-5 of FIG. 4 and showing a rotary screen door in a closed position.

With reference to FIGS. 3-5, the screen drive assembly 50 includes a shaft assembly 66 operatively coupled to an output shaft (not shown) of the prime mover 24 and driven to rotate about a rotational axis 67. The shaft assembly 66 includes a first shaft segment 68 that supports the driven pulley 54 and a second shaft segment 70 releasably coupled to the first shaft segment 68 and supporting a drive pulley 71.

The first shaft segment 68 extends through an aperture 72 defined in the screen door 40, so that the driven pulley 54 is supported outside the enclosure 34 and proximate the rotary screen 48. A first support bracket 74 is coupled to the door 40 and supports a pair of first bearing retainers 76. The first bearing retainers 76 receive a pair of first bearings 78 that support the first shaft segment 68 for rotation relative to the screen door 40.

The second shaft segment 70 is located behind the screen door 40 and within the enclosure 34. A second support bracket 80 is coupled to the body 32 and supports a pair of second bearing retainers 82. The second bearing retainers 82 receive a pair of second bearings 84 that support the second shaft segment 70 for rotation relative to the second support bracket 80.

The shaft assembly 66 further includes a pair of opposed magnetic couplers selectively engageable with one another to transfer torque between the first shaft segment 68 and the second shaft segment 70. In the illustrated embodiment, each magnetic coupler includes one or more permanent magnets. In other embodiments (not shown), the magnetic couplers could instead include one or more electromagnets at either or both shaft segments 68, 70, which may be selectively activated or deactivated as desired. The magnetic couplers include a first coupler 86 affixed to the first shaft segment 68 and an opposed second coupler 88 affixed to the second shaft segment 70. In the illustrated embodiment, each coupler 86, 88 includes a hub 90, a central bore 92 extending through the hub 90, and a flange 94 extending radially outward from the hub 90. The first magnetic coupler 86 defines a first end face 96, and the second magnetic coupler 88 defines a second end face 97 that faces toward the first end face 96. A magnetic attractive force between the adjacent couplers 86, 88 rotatably couples the first coupler 86 to the second coupler 88. The magnetic attractive force acting between the couplers 86, 88 includes an axial component that acts in an axial direction of the shaft assembly 66 to pull the couplers 86, 88 toward one another.

When a torque is applied to one of the shaft segments 68, 70, the magnetic attractive force between the two magnetic couplers 86, 88 results in a torque transmitted therebetween. Thus, the magnetic couplers 86, 88 rotatably couple the first shaft segment 68 to the second shaft segment 70. In some embodiments (not shown), a shroud (e.g., in the form of a tube) may surround the magnetic couplers 86, 88 to prevent foreign objects (e.g., metal hand tools) from contacting the couplers 86, 88 in order to prevent damage that may occur due to the magnetic forces involved in the immediate vicinity. In some embodiments, the shroud may be supported on the body 32 within the enclosure 34, and may surround the second coupler 88 so that a rim of the shroud extends beyond the second face 97 of the second coupler 88 by a distance of, e.g., 25 mm. Since the second coupler 88 may continue rotating when the rotary screen door 40 is opened and the couplers 86, 88 are de-coupled from one another (discussed in further detail below), the shroud in these embodiments continues to surround the rotating second coupler 88 to prevent foreign objects from interfering therewith.

With continued reference to FIGS. 3-5, when the screen door 40 is located in a closed position as illustrated in FIG. 5, the first coupler 86 is located in close proximity to the second coupler 88, with the end faces 96, 97 oriented generally opposed and parallel to one another. But, a gap 98 of predetermined width W is maintained between the couplers 86, 88 so that the couplers 86, 88 do not make contact with one another. The width W of the gap 98 is maintained due to an axial reactionary force exerted on each shaft segment 68, 70 by the respective first and second bearings 78, 84 in response to the axial component of the magnetic attractive force acting between the opposed couplers 86, 88. In the illustrated embodiment, the width W normally set to 6 mm with a tolerance of 1 mm.

In some embodiments, the width W of the gap 98 is adjustable, e.g., by adjusting a position of one or both couplers 86, 88 along a longitudinal extent of the corresponding shaft segment 68, 70, or by adjusting a position of the first and/or the second bearings 78, 84 along the longitudinal extent of the corresponding shaft segment 68, 70. By adjusting the width W of the gap 98, the attractive force acting between the opposed couplers 86, 88 can be increased or decreased as desired to adjust a maximum torque threshold that may be transmitted between the couplers 86, 88. When the maximum torque threshold is exceeded, i.e., when the torque required to drive one of the shaft segments 68, 70 to rotate via the other shaft segment 70, 68 exceeds the maximum torque threshold, the couplers 86, 88 break away (i.e., rotationally de-couple) so that the shaft segments 68, 70 cease co-rotating. This prevents damage to the rotary screen 48, the vacuum arm 62, or components of the screen drive assembly 50 that could otherwise occur if the rotary screen 48 were to become seized (e.g., in an event that ice were to build up between the brushes 64 and the rotary screen 48 to seize the rotary screen 48 to the vacuum arm 62). In the illustrated embodiment, the width W of 6 mm results in a maximum torque threshold or torque capacity of between 22 Newton meters (Nm) and 34 Nm.

Figure 6:
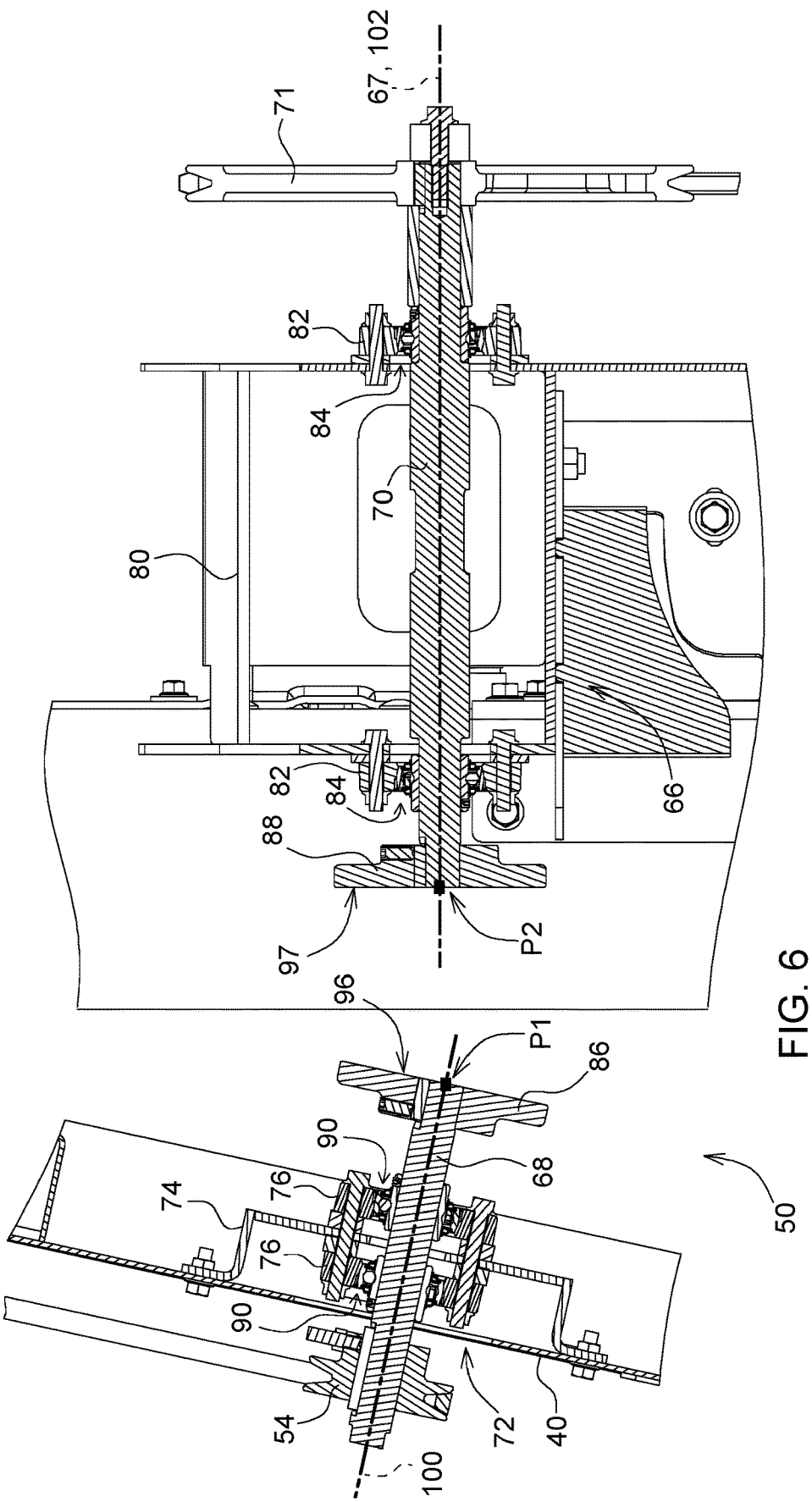
FIG. 6 is another cross-sectional view of the portion of the work vehicle shown in FIG. 2, taken along line 5-5 of FIG. 4 and showing the rotary screen door in an open position.

With reference to FIGS. 5 and 6, the first shaft segment 68 defines a first central axis 100 and the second shaft segment 70 defines a second central axis 102. The first and second central axes 100, 102 are shown co-linear with one another and with the rotational axis 67 in FIG. 5. The first central axis 100 intersects the first end face 96 to define a first reference point P1 of the first magnetic coupler 86, and the second central axis 102 intersects the second end face 97 to define a second reference point P2 of the second magnetic coupler 88. During assembly of the work vehicle 10, or due to wear, damage, temperature, or other factors, the shaft couplers 86, 88 may become misaligned with one another. Misalignment between the shaft couplers 86, 88 may include a 'radial' misalignment, i.e., the first reference point P1 of the first magnetic coupler 86 being radially offset from the second central axis 102 of the second shaft segment 70 by a distance D measured perpendicular to the second central axis 102. Misalignment may also include 'angular' misalignment, if during operation the end faces 96, 97 are non-parallel to one another such that an angle A is formed between the end faces 96, 97. A combination of radial and angular misalignment between the couplers 86, 88 is also possible.

The magnetic couplers 86, 88 allow for greater misalignment forgiveness than traditional mechanical couplers, as no physical contact is required to transmit torque. In the illustrated embodiment, the magnetic couplers 86, 88 may tolerate a radial misalignment, measured as the distance D, of up to 6 mm. Additionally, the magnetic couplers 86, 88 of the illustrated embodiment may tolerate an angular misalignment, measured as the angle A, of up to 3 degrees. Moreover, unlike traditional couplers, which must be 'rotationally' aligned with one another about the rotational axis 67, the magnetic couplers 86, 88 do not need to be rotationally aligned to one another and will engage one another regardless of their initial relative rotational orientation about the rotational axis 67.

In operation, the prime mover 24 supplies torque to the output shaft (not shown), which is transmitted to the drive pulley 71 to rotate the second shaft segment 70 about the rotational axis 67. The rotating second shaft segment 70 transfers torque to the first shaft segment 68 via the engagement between the magnetic couplers 86, 88, causing the first shaft segment 68 including the driven pulley 54 to likewise rotate about the rotational axis 67. The rotating driven pulley 54 drives the screen belt 60, which engages the rotary screen 48 to rotate the rotary screen 48 about the screen axis 52. As the rotary screen 48 rotates, the vacuum arm 62 including the brushes 64 engage successive areas of the rotary screen 48 to remove debris therefrom.

During operation, the user may desire to open the screen door 40 while the prime mover 24 and the rotary screen 48 are operating (e.g., in order to clean the cooling cores 36 by blowing compressed air across them to clear away debris). The rotary screen door 40 can be opened by pivoting the door 40 away from the body 32 about the hinge axis 44 toward an open position (FIG. 6). As the screen door 40 swings away from the body 32, the first shaft segment 68, which is coupled to the door 40 via the first support bracket 74, moves with the door 40 and swings away from the second shaft segment 70 to de-couple the magnetic couplers 86, 88. When the screen door 40 is in the open position, the rotary screen 48 stops rotating because the second shaft segment 70 stops transmitting torque to the first shaft segment 68. When the screen door 40 is returned to a closed position (FIG. 5), the shaft segments 68, 70 are realigned and the first coupler 86 is brought back into close proximity with the second coupler 88 to reestablish the connection therebetween.

Although the disclosure has been described in detail with reference to certain preferred embodiments, variations and modifications exist within the scope and spirit of one or more independent aspects of the disclosure as described.

What is claimed is:

1. A rotary screen drive assembly for a work vehicle, the work vehicle including a door movable between a closed position and an open position, and a screen rotatably supported on the door and configured to filter air passing through an air inlet defined in the door, the rotary screen drive assembly comprising:
    a first shaft segment having a first end configured to be coupled to the screen to drive the screen to rotate relative to the door, and having a second end affixed to a first magnetic coupler; and
    a second shaft segment having a first end configured to be coupled to the prime mover, and having a second end affixed to a second magnetic coupler configured to selectively engage the first magnetic coupler to rotatably couple the first shaft segment to the second shaft segment when the door is in the closed position;
    wherein each magnetic coupler defines an end face, and each magnetic coupler is configured such that, in the closed position of the door, the end faces of each magnetic coupler are oriented opposed and parallel to one another and are spaced apart from one another such that an uninterrupted gap is defined between the end faces.

2. The rotary screen drive assembly of claim 1, further comprising a driven pulley securable to the first shaft segment, and a belt for coupling the driven pulley to the screen to transfer torque from the first shaft segment to the screen.

3. The rotary screen drive assembly of claim 1, wherein an axial position of at least one of the first and second magnetic couplers is adjustable relative to the corresponding shaft segment to adjust a width of the gap.

4. The rotary screen drive assembly of claim 1, wherein each of the first and second magnetic couplers includes one or more permanent magnets.

5. The rotary screen drive assembly of claim 1, further including a shroud that surrounds the first and second couplers when the door is in the closed position.

6. The rotary screen drive assembly of claim 1, wherein the magnetic couplers define a maximum torque threshold when the door is in the closed position, wherein the second magnetic coupler rotationally decouples from the first magnetic coupler when the maximum torque threshold is exceeded, and wherein a width of the gap is adjustable to adjust the maximum torque threshold.

7. The rotary screen drive assembly of claim 1, wherein when the door is in the closed position, the second magnetic coupler engages the corresponding first magnetic coupler to transfer torque supplied from the prime mover to the first shaft segment.

8. The rotary screen drive assembly of claim 7, wherein when the door is moved to the open position, the first magnetic coupler disengages from the second magnetic coupler.

9. The rotary screen drive assembly of claim 1, further comprising a driven pulley affixed to the first shaft segment, and a belt trained around the driven pulley and the screen to transfer torque from the first shaft segment to the screen.

10. The rotary screen drive assembly of claim 1, wherein the first shaft segment defines a first shaft axis and the second shaft segment defines a second shaft segment, and wherein in the open position of the door the first shaft axis defines an oblique angle with the second shaft axis.

* * * * *